United States Patent
Massoud et al.

(10) Patent No.: US 12,282,096 B2
(45) Date of Patent: Apr. 22, 2025

(54) METHOD AND APPARATUS FOR A COMPUTATIONALLY EFFICENT LIDAR SYSTEM

(71) Applicant: HUAWEI TECHNOLOGIES CO., LTD., Shenzhen (CN)

(72) Inventors: Ali Ahmed Ali Massoud, Kanata (CA); Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 951 days.

(21) Appl. No.: 17/324,794

(22) Filed: May 19, 2021

(65) Prior Publication Data

US 2022/0373684 A1  Nov. 24, 2022

(51) Int. Cl.
*G01S 17/08* (2006.01)
*G01S 17/88* (2006.01)
*G06F 16/9035* (2019.01)
*G06F 17/14* (2006.01)

(52) U.S. Cl.
CPC ............. *G01S 17/88* (2013.01); *G01S 17/08* (2013.01); *G06F 16/9035* (2019.01); *G06F 17/142* (2013.01)

(58) Field of Classification Search
CPC .......... G01S 17/88; G01S 17/08; G01S 17/34; G06F 17/142; G06F 16/9035; G06F 16/909; G06N 5/01
USPC ....................................................... 356/4.01
See application file for complete search history.

(56) References Cited

U.S. PATENT DOCUMENTS 7,969,345 B2    6/2011  Abatzoglou et al.
9,538,309 B2 *  1/2017  Nielsen .................... H04R 5/02

FOREIGN PATENT DOCUMENTS

| CN | 101017202 A | 8/2007 |
| CN | 101320086 A | 12/2008 |
| CN | 105891600 A | 8/2016 |
| CN | 109581320 A | 4/2019 |
| CN | 112612009 A | 4/2021 |

OTHER PUBLICATIONS

Bhutani, A.; Marahrens, S.; Gehringer, M.; Gottel, B.; Pauli, M.; Zwick, T., "The Role of Millimeter-Waves in the Distance Measurement Accuracy of an FMCW Radar Sensor", Sensors 2019, 19, 3938.
Bujakovic D.; Andric M.; Mikluc D.; Bondnulic B., "Analysis of human radar echo signal using warped discrete fourier transform", New Trends in Signal Processing (NTSP), Demanovska Dolina, Slovakia, Oct. 2016.

* cited by examiner

Primary Examiner — Daniel L Murphy

(57) ABSTRACT

Aspects of the disclosure provide a method of a LiDAR system to determine the distance of an object from the LiDAR system. Embodiments of the LiDAR system can use a coarse estimate of the distance of an object from the LiDAR system which is then used by a fast search to determine an estimate of the distance of an object from the LiDAR system within a precision threshold. In some embodiments the LiDAR system can use adaptive precision when determining the distance of an object from the LiDAR system.

18 Claims, 11 Drawing Sheets

METHOD AND APPARATUS FOR A COMPUTATIONALLY EFFICENT LIDAR SYSTEM

CROSS-REFERENCE TO RELATED APPLICATIONS

This is the first application filed for the present invention.

FIELD

This disclosure relates to the field of determining the distance of an object in general, and to using light detection and ranging (LiDAR) to determine a distance of an object in particular and in some instances to using a frequency modulated continuous wave (FMCW) LiDAR system.

BACKGROUND

Light detection and ranging (LiDAR) uses light generated for example by a laser to measure the distance of an object from a LiDAR system. Automobiles employing LiDAR based technology (for example for self-driving applications) require the use of high resolution and fast frame rate to accurately estimate the distance of an object from the automobile. Current high resolution and fast frame rate computation techniques are computationally complex and therefore require a significant number of operations to be processed in order to determine the distance of an object from the automobile. This can add to cost and complexity of LiDAR systems.

Accordingly, there is a need for a method and apparatus that at least partially addresses one or more limitations of the prior art including reducing the computational complexity (e.g. as measured by number of elementary operations) required to accurately estimate the distance of an object using a LiDAR system.

This background information is provided to reveal information believed by the applicant to be of possible relevance to the present invention. No admission is necessarily intended, nor should be construed, that any of the preceding information constitutes prior art against the present invention.

SUMMARY

Embodiments of the present disclosure provide for a method and apparatus for LiDAR operation. In particular, embodiments of the present disclosure provide methods and apparatuses for a computationally efficient LiDAR system.

In accordance with embodiments of the present disclosure, there is provided a method of estimating a distance of an object from a LiDAR system, performed by the LiDAR system. The method includes determining a coarse estimate of the distance of the object from the LiDAR system. The method further includes refining the coarse estimate of the distance by determining a fast search estimate of the distance of the object from the LiDAR system, wherein the fast search estimate is within a precision threshold, the precision threshold at least in part based on the coarse estimate.

In some embodiments, determining a coarse estimate is performed using a fast Fourier transform operation. In some embodiments, determining the fast search estimate includes performing one or more iterations of a search operation. In some embodiments, the search operation is a Fibonacci search.

In some embodiments, determining the fast search estimate includes determining a first search value and a second search value wherein the first search value is less than the second search value and both the first search value and second search value are within a search range, the search range at least in part defined by the coarse estimate. Determining the fast search estimate further includes determining an estimated first object distance using the first search value and determining an estimated second object distance using the second search value. Determining the fast search estimate further includes comparing the first object distance and the second object distance and based on the comparison, either eliminating, from the search range, search values that are less than the first search value or eliminating, from the search range, search values that are greater than the second search value. Determining the fast search estimate further includes iterating the search operation until the fast search estimate is within the precision threshold.

In some embodiments, determining the estimated first object distance includes determining a minimum search value included in the search range and determining a first search value using a difference between a length of a selected Fibonacci sequence and a next lower search value. Determining the estimated first object distance further includes determining a second search value using an aggregate of the length of the selected Fibonacci sequence and the next lower search value expanded by a difference between a maximum search value included in the search range and the minimum search value included in the search range.

In some embodiments, determining the estimated second object distance includes determining a maximum search value included in the search range and determining a first search value using a difference between a length of a selected Fibonacci sequence and a next lower search value. Determining the estimated second object distance further includes determining a second search value using an aggregate of the length of the selected Fibonacci sequence and the next lower search value expanded by a difference between a maximum search value included in the search range and the minimum search value included in the search range.

In some embodiments, the method further includes determining a new first search value and a new second search value for each iteration of one or more iterations the search operation. In some embodiments, the method further includes determining a new estimated first object distance of the object from the LiDAR system based on the new first search value. In some embodiments, the method further includes determining a new estimated second object distance of the object from the LiDAR system based on the new second search value.

In accordance with embodiments of the present disclosure, there is provided an apparatus for estimating a distance of an object from a LiDAR system, performed by the LiDAR system. The apparatus a processor and a memory storing machine executable instructions, which when executed by the processor configure the apparatus to one or more of the methods defined above or elsewhere herein.

The foregoing and other objects, features, aspects and advantages of the present invention will become more apparent from the following detailed description, taken in conjunction with the accompanying drawings which description is by way of example only.

BRIEF DESCRIPTION OF THE FIGURES

For a more complete understanding of this disclosure, reference is now made to the following brief description, taken in connection with the accompanying drawings and detailed description, wherein like reference numerals represent like parts.

DETAILED DESCRIPTION

It is understood that computational complexity is not expressed in terms of units of time because units such as seconds, minutes, hours, days, months, and years are dependent on the specific choice of computer and the state of technology. As a result, it has been realized that the computational complexity of a LiDAR system's estimation of the distance of an object is quantified in terms of counting the number of elementary operations executed during the distance estimation.

Embodiments of this disclosure can use one or more search operations that can be adjusted or optimized to reduce the computational complexity of high resolution and fast frame rate computation techniques that can be used to determine (e.g. estimate) the distance of an object from the LiDAR system.

Self-driving automobiles can use a LiDAR system to estimate the distance of an object from the automobile. LiDAR systems can use computationally complex high resolution and fast frame rate computation techniques in order to improve object distance estimation. LiDAR systems can be easier to implement and can more quickly estimate the distance of an object, when the computational complexity of the object distance estimation computation techniques used by the LiDAR system are reduced. Computational complexity can be reduced by reducing the number of elementary operations executed by the estimation computation techniques when these techniques are used to estimate the distance of an object. Embodiments of the present disclosure are not necessarily limited to automotive applications, but rather can be used in a variety of other applications that involve detection and location of objects using LiDAR.

Figure 1:
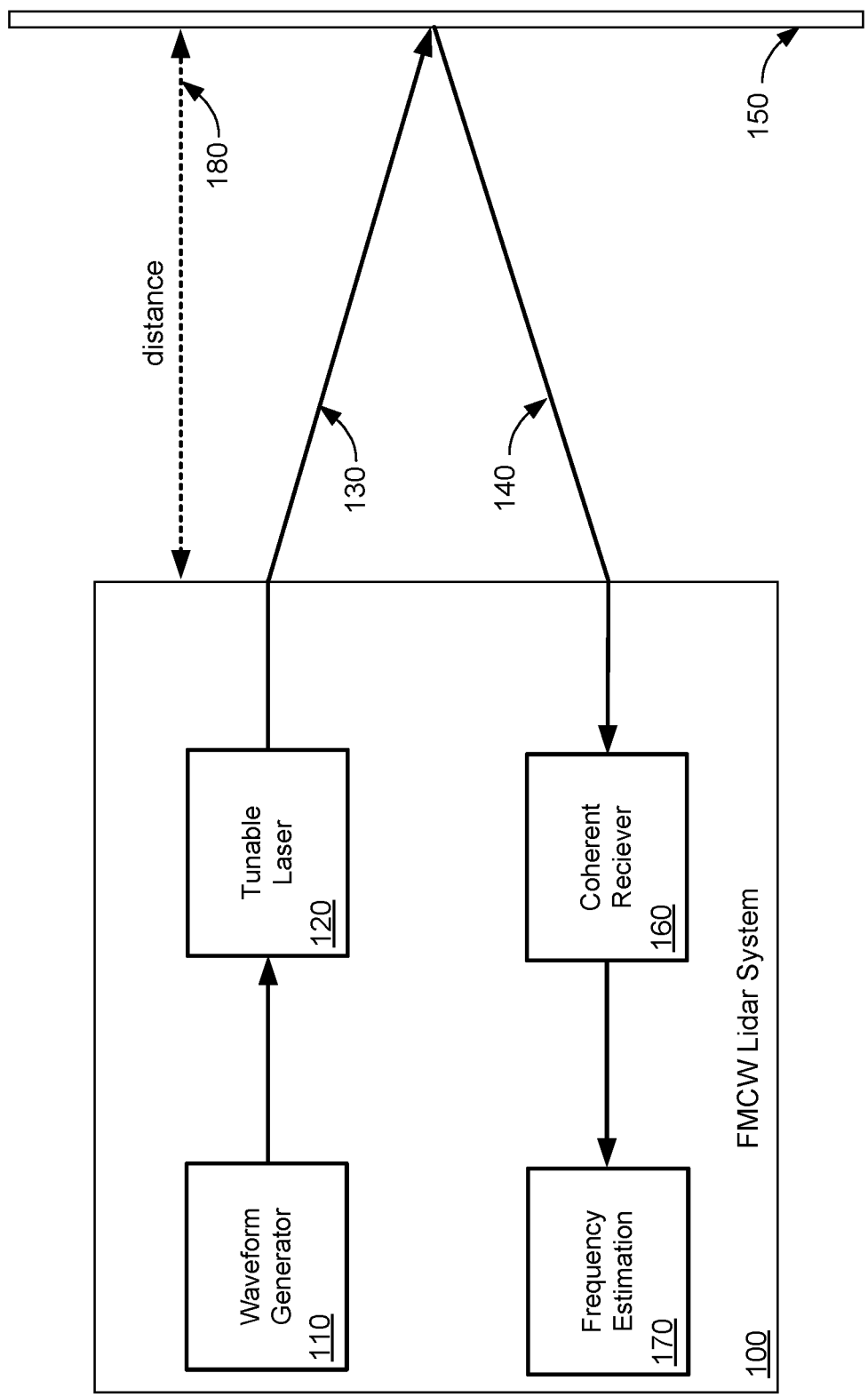
FIG. 1 illustrates an example frequency modulated continuous wave (FMCW) LiDAR apparatus.

FIG. 1 illustrates a schematic view of the main components of a frequency modulated continuous wave (FMCW) LiDAR system 100 and the signalling used to estimate the distance of an object from the LiDAR system 100. The waveform generator 110 applies a signal to the tunable laser 120 so that the tunable laser 120 generates laser light 130. The light 130 strikes the object 150. The received light 140 is a portion of the light 130 which is reflected by the object 150 and which is incident upon, and detected by, the coherent receiver 160. The coherent receiver 160 then passes a signal corresponding to the received light 140 to the frequency estimation block 170 to the estimate distance 180. In some cases, the tunable laser can be replaced with another appropriate source of directed light, as would be readily understood by a worker skilled in the art.

FMCW LiDAR operates by repeatedly "chirping" a beam of light. This can involve transmitting a light beam which is time-varying in optical frequency, typically according to a sawtooth or triangular waveform pattern. A portion of the beam is reflected off of an object and received at the LiDAR device. This return beam is also time-varying in optical frequency, but is time-shifted relative to the transmitted beam, with the amount of time shift depending on distance to the object. The return beam is interferometrically combined, at a coherent receiver, with a portion of the transmitted beam (or an associated signal generated from the local oscillator) which produces a heterodyne beat frequency. This beat frequency is proportional to the time-of-flight of the return beam and thus representative of the distance to the object. Therefore, by determining (e.g. estimating) the beat frequency the distance to the object can be determined. For example, by estimating the time-of-flight of the light beam from the LiDAR to the object and back to the LiDAR, the distance between the LiDAR and the object can be determined as being half of the time-of-flight multiplied by the speed of light. As used herein, and unless context indicates otherwise, to "determine" a quantity is to find out, measure, discover, estimate, calculate or otherwise decide upon the size or amount or other value of the quantity; and such determination need not be exact.

Figure 2A:
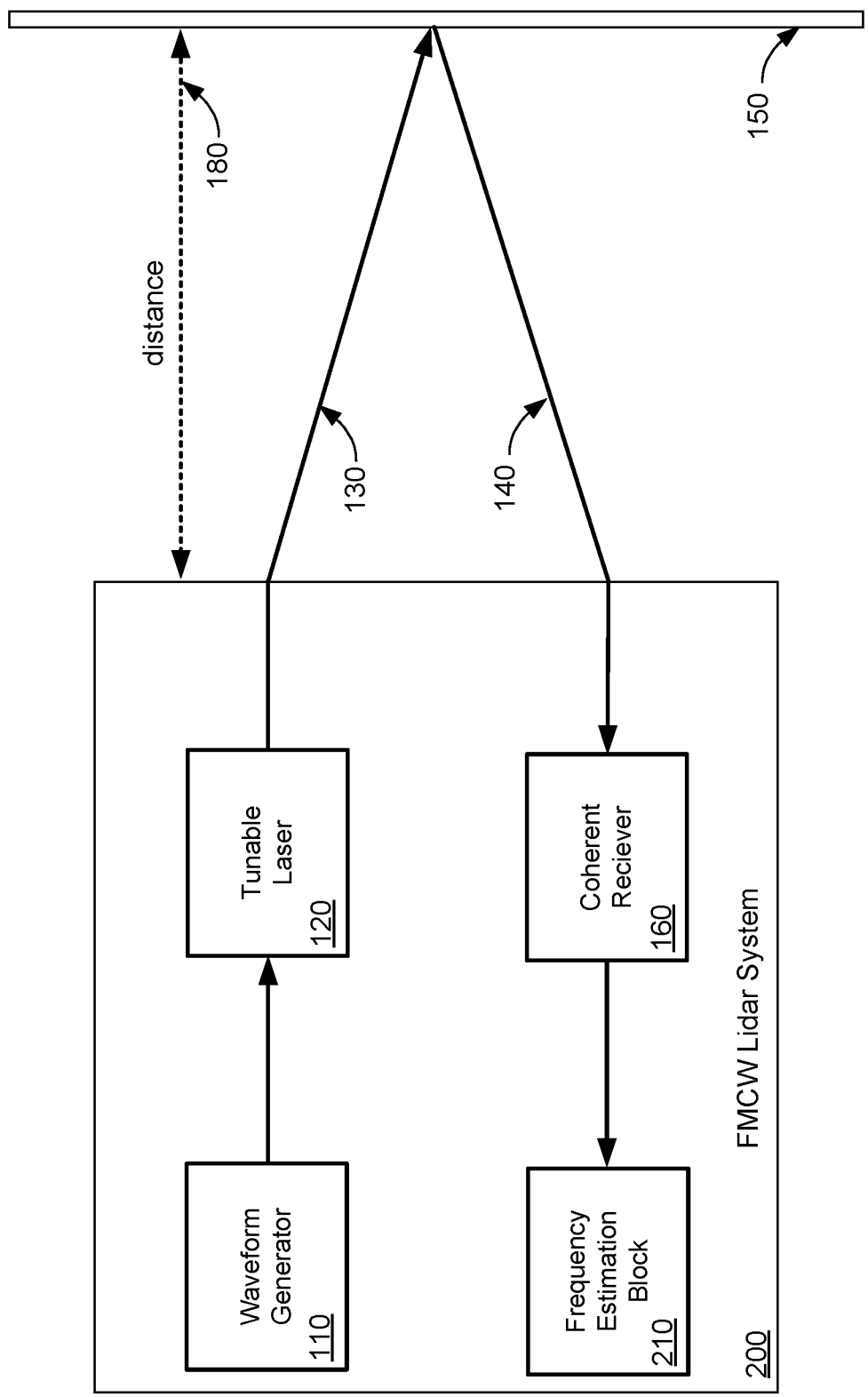
FIG. 2A illustrates an example FMCW LiDAR with improved frequency estimation, according to an embodiment.
Figure 2B:
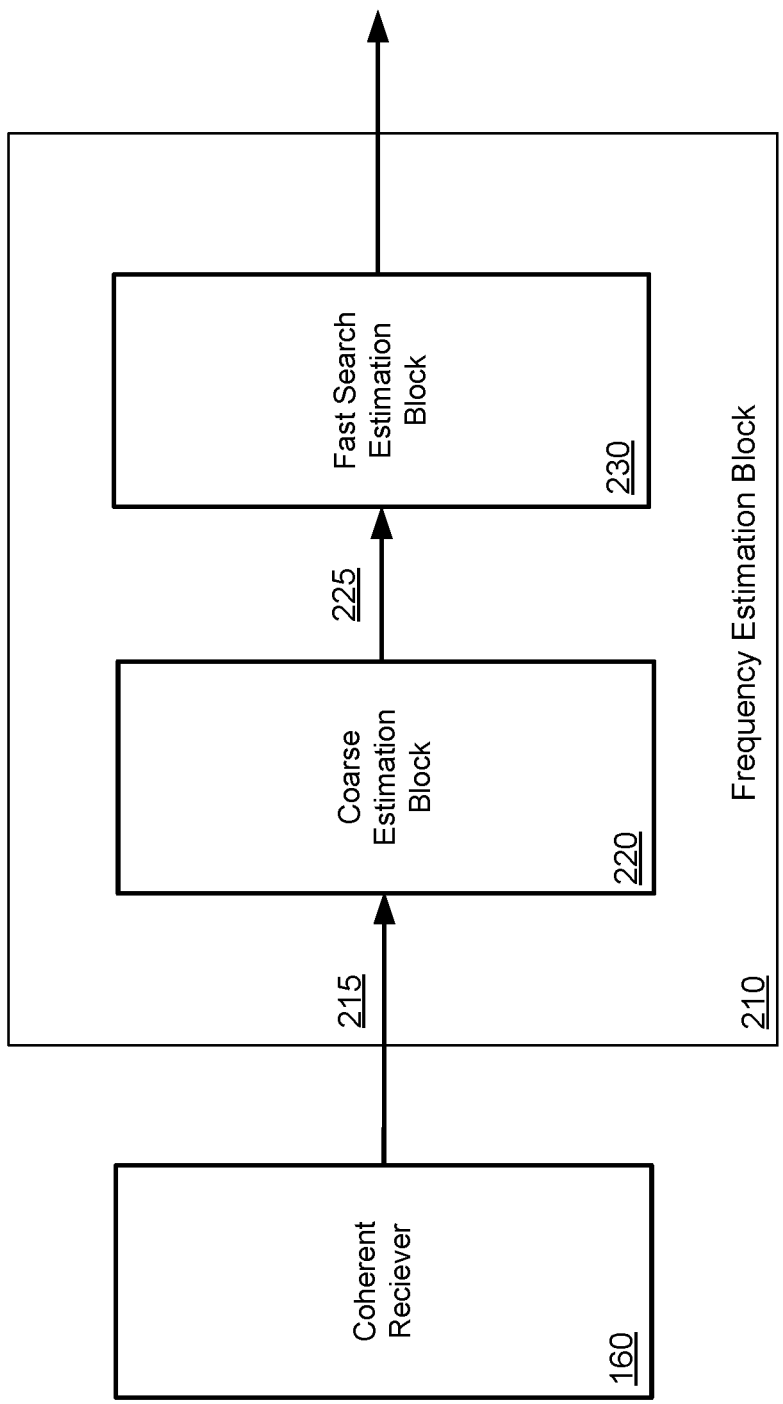
FIG. 2B schematically illustrates frequency estimation, according to an embodiment.

FIG. 2A illustrates an embodiment of the disclosed LiDAR system 200 which can include a computationally efficient frequency estimation block 210. The frequency estimation block can correspond to frequency estimation circuitry in the case of an apparatus, or to frequency estimation operations in the case of a method. FIG. 2B illustrates a schematic view of the coherent receiver 160 and the frequency estimation block 210. FIG. 2B further illustrates the signalling 215 that can be sent from the coherent receiver 160 to the coarse estimation block 220 and the signalling 225 that can be sent from the coarse estimation block 220 to the fast search estimation block 230.

Several LiDAR systems use a fast Fourier transform (FFT) operation that employs zero padding to interpolate the frequency spectrum corresponding to the light 140 received by the coherent receiver 160. For example, zero padding refers to a concept of adding zeros to the end of a time domain signal to increase the length of the signal. This process can make a waveform have a power of two number of samples and can provide a means for speeding up processing time. Zero padding is used because a zero padded FFT used to interpolate the frequency spectrum increases the resolution of the estimated object distance. However, the use of zero padding can result in a significant increase in the computational complexity required to estimate the distance of an object from the LiDAR system.

Embodiments of this disclosure can use one or more search operations that can be adjusted or optimized to reduce the computational complexity of high resolution and fast frame rate computation techniques that can be used to determine (e.g. estimate) the distance of an object from the LiDAR system 200. Search operations that can be used by embodiments of this disclosure can include determining a coarse estimate of the distance of an object from the LiDAR system 200 using the coarse estimation block 220, which can be followed by using this coarse estimate to determine a fast search estimate of the distance of the object from the LiDAR system 200 using the fast search estimation block 230, as illustrated by FIG. 2B. According to embodiments, the fast search estimate block can be configured to provide a fast search estimate of the distance to the object at least in part based on a precision threshold or fine threshold.

According to embodiments, the precision threshold or fine threshold can be based on one or more parameters, for example a necessary precision of the estimate, the estimated distance to the object, use of the estimated distance or other parameter. For example, when an object is located at a greater distance, for example 500 m away, the precision threshold can be plus or minus 10 m. As another example, if the use of the estimated distance is to aid with car parking, the precision threshold can be plus or minus 10 cm. It is understood that these are to be considered merely as examples and other features that may impact the precision threshold would be readily understood.

Embodiments of this disclosure can include a coarse estimation block 220. The coarse estimate of the distance to an object can be based on an FFT operation. The coarse estimation block 220 can interpolate the frequency spectrum of a coarse FFT that is not necessarily zero padded and can correspond to the light 140 received by the coherent receiver 160 for the determination of a first (e.g. rudimentary) estimate of the distance of an object from LiDAR system 200.

Embodiments of this disclosure can further include a fast search estimation block 230 which can use one of a variety of search types or methods to determine a finely-tuned estimate of the distance of the object from the LiDAR system 200. Non-limiting examples of applicable search types or methods include Fibonacci search, binary search, golden section search, or Newton search, applied either alone or in any combination.

For example, a binary search, also known as half-interval search, logarithmic search, or binary chop, is a search method that finds the position of a target value within a sorted array. A binary search compares the target value to the middle element of the array. If they are not equal, the half in which the target cannot lie is eliminated and the search continues on the remaining half, again taking the middle element to compare to the target value, and repeating this until the target value is found. If the search ends with the remaining half being empty, the target is not in the array.

For example, a golden-section search is a technique for finding an extremum (minimum or maximum) of a function inside a specified interval. For a strictly unimodal function with an extremum inside the interval, this search it will find that extremum, while for an interval containing multiple extrema (possibly including the interval boundaries), this search will converge to one of them. If the only extremum on the interval is on a boundary of the interval, the search will converge to that boundary point. The method operates by successively narrowing the range of values on the specified interval, which makes it relatively slow, but very robust.

For example, the Newton method, also known as the Newton-Raphson method, is a root finding method which produces successively better approximations to the roots (or zeroes) of a real valued function.

For example, the Fibonacci search is a method of searching a sorted array using a divide and conquer method that narrows down possible locations with the aid of Fibonacci numbers. Compared to a binary search where the sorted array is divided into two equal-sized parts, one of which is examined further, Fibonacci search divides the array into two parts that have sizes that are consecutive Fibonacci numbers. On average, this leads to about 4% more comparisons to be executed, but it has the advantage that one only needs addition and subtraction to calculate the indices of the accessed array elements, while classical binary search needs bit-shift, division or multiplication.

One or more iterations of one or more of such search types or methods, either alone or in any combination, may result in the search arriving at one or more of a new first search value and a second search value. The new first search value or the second search value can be used to determine a first estimated object distance or a second estimated object distance. An estimated object distance may be determined based on the first estimated object distance exceeding the second estimated object distance.

Embodiments of this disclosure can include fast search estimation block 230 that uses adaptive precision. Adaptive precision can be used when estimating object distance from the LiDAR system so that, by way of a non-limiting example, more precision can be used to estimate the distance of objects that are relatively closer to the LiDAR system and less precision can be used to estimate the distance of objects that are relatively further from the LiDAR system.

Embodiments of this disclosure can include the use of adaptive precision in which the amount (e.g. level) of precision of the distance estimate can be adjusted based on the coarse estimate of the distance of an object from the LiDAR system 200. The coarse estimate of the distance is used to arrive at a precision or precision threshold associated with the coarse estimate of the distance can at least in part be determined based on a coarse estimate tolerance or coarse threshold. As such this coarse estimate tolerance or coarse threshold can be related to the coarse estimate of the distance of an object from LiDAR system 200. For example, the coarse estimate tolerance or coarse threshold can be greater for an object determined to be further away from the LiDAR system, while the coarse estimate tolerance can be smaller for an object determined to be closer to the LiDAR system. As used herein, the term "threshold" can be used to define an amount of error that is permissible for the determination of a respective estimate. For example, a threshold can define a maximum error of a respective estimate. As an example, a threshold can define the distance error associated with the estimate and as such the estimate can be greater than or less than the distance by the defined threshold.

In some embodiments of this disclosure, the amount of precision used in implementing adaptive precision of the fast search estimation of the LiDAR system 200 can affect the number of iterations of the fast search estimation operation used for estimating the distance of an object from the LiDAR system 200. As a non-limiting example, more iterations of the fast search estimation operation can be used to estimate the distance of an object from the LiDAR system 200 when (as indicated by the coarse estimate) the object is relatively close to the LiDAR system 200. As another non-limiting example, fewer iterations of the fast search estimation operation can be used to estimate the distance of an object from the Li DAR system 200 when (as indicated by the coarse estimate) the object is relatively far from the LiDAR system 200.

A coarse estimate for a LiDAR system can use an iterative chirp z-transform algorithm. This iterative chirp z-transform algorithm can also be referred to as a zoomed FFT. A zoomed FFT utilizes a certain portion of the coarse estimate. A zoomed FFT is different from the fast search estimation that can be used by embodiments of this disclosure because a zoomed FFT is not a full search. According to embodiments of the present disclosure, a full FFT is performed for each iteration of the zoomed FFT, and each iteration of the zoomed FFT considers a limited subset of the previous portion of a coarse estimate.

Embodiments of this disclosure can include a fast search estimation operation that uses one or more iterations of a Fibonacci search. Unlike the iterative chirp z-transform, a Fibonacci search may utilize the entirety of results from a coarse estimate. As a result, and in contrast, fast search estimation, as implemented in various embodiments of the present disclosure can potentially arrive at an estimate of the object distance on the first iteration of the fast search estimation.

Embodiments of this disclosure can include a fast search estimation that can use a Fibonacci search and can calculate a full FFT of two points for each iteration of the fast search estimation. However, the zoomed FFT calculates a full FFT of each point and for each iteration. As a result, because the number of full FFT calculations of each point for each zoomed FFT iteration is significantly greater than two, the number of FFT calculations performed by the zoomed FFT requires execution of more elementary operations and is therefore more computationally complex than the computational complexity of a Fibonacci search.

The full FFT calculated for the two points of each iteration of the fast search estimation by a Fibonacci search can be analysed to determine if the search is converging on an estimated object distance, or alternatively if the search is not converging. Convergence and non-convergence can be determined, because the number of iterations of a search is non-predetermined, by calculating the mathematical difference of the full FFT of the two points of the Fibonacci search during the current iteration and the full FFT of the two points of the Fibonacci search of any combination of one or more of the previous iterations. As a non-limiting example, a mathematical difference of these values that decreases over a plurality of iterations can be an indication that the fast search estimate is converging and a mathematical difference of these values that increases or does not sufficiently decrease over a plurality of iterations can be an indication that the fast search estimate is not converging.

Figure 3:
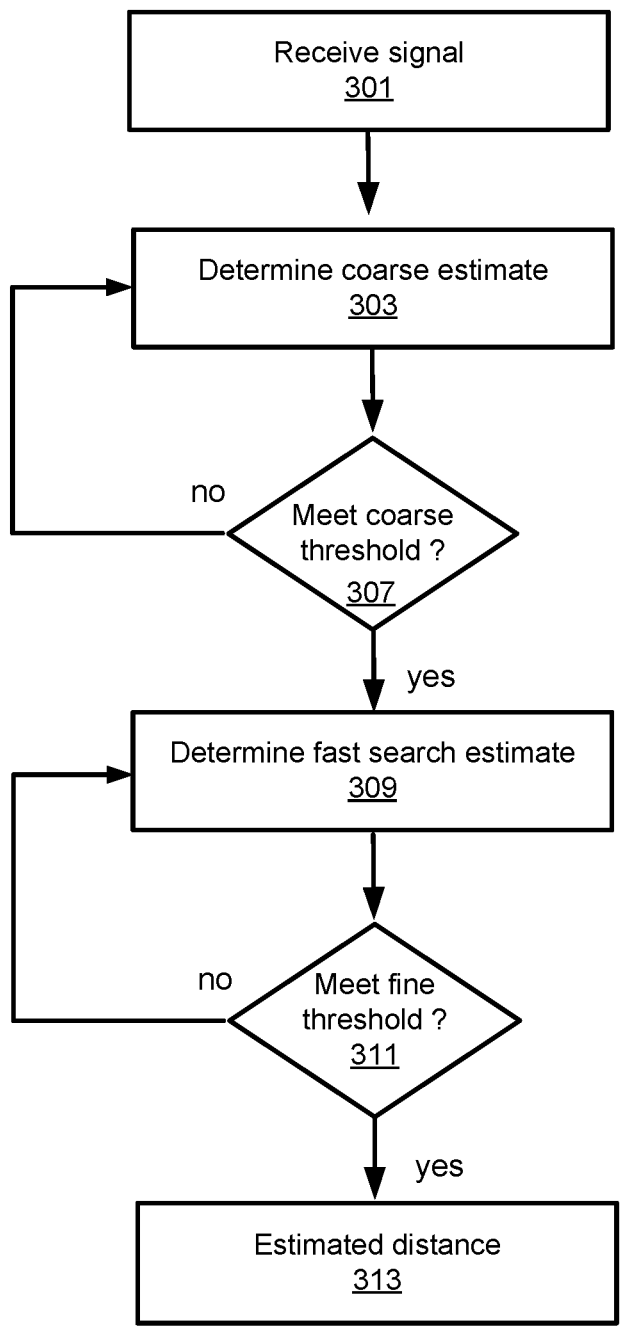
FIG. 3 illustrates a method for distance estimation according to embodiments.

FIG. 3 illustrates a method of distance estimation of an object by a LiDAR system according to embodiments of the present disclosure. The method includes receiving 301 a signal by the frequency estimation block, and in particular the coarse estimation block. The method further includes determining 303 a coarse estimate from the signal, the coarse estimate being indicative of a first estimate (e.g. rudimentary estimate) of the distance of the object from the LiDAR system. In some embodiments, the coarse estimate can be based on an FFT operation.

In some embodiments, the method further includes comparing 307 the coarse estimate with a coarse threshold and if the coarse estimate meets the coarse threshold, the method proceeds to determining 309 a fast search estimate. However, if the coarse estimate does not meet the coarse estimate threshold, the method returns to the step of determining 303 a coarse estimate. According to embodiments, the coarse threshold can be defined by a precision threshold which can be based on one or more parameters, for example a necessary precision of the estimate, the estimated distance to the object, use of the estimated distance or other parameter. For example, if the coarse estimate identifies the object as being a small distance away, the coarse threshold may be smaller. However, if the coarse estimate identifies the object as being a large distance away, the coarse threshold may be larger. The coarse estimate is subsequently used as the starting point for the subsequent steps.

The method further includes refining the coarse estimate of the distance by determining 309 a fast search estimate by the fast search estimation block which forms a further part of the frequency estimation block. It will be understood that the step of refining the coarse estimate of the distance by determining a fast search estimate provides for the refinement or accuracy improvement of the coarse estimate previously determined. As such, through the step of refining the coarse estimate, the coarse estimate of the distance is in fact replaced by the improved estimate of the distance that is determined by the fast search estimation block. By performing a coarse estimate initially, the step of determining the fast search estimate can be limited to a particular distance or distance range, thereby potentially decreasing the computations required for determining the distance to the object. The determining 309 step can be performed by one of a variety of search types or methods to determine a finely-tuned estimate of the distance of the object from the LiDAR system 200. Non-limiting examples of applicable search types or methods include Fibonacci search, binary search, golden section search, or Newton search, applied either alone or in any combination.

The method further includes comparing 311 the fast search estimate with a fine threshold and if the fast search estimate meets the fine threshold, the method has determined 313 the estimated distance. However, if the fine estimate does not meet the fine threshold, the method returns to the step of determining 309 a fast search estimate. According to embodiments, the fine threshold can be defined by an amount of precision used in implementing the fast search estimation of the distance of an object from the LiDAR system and can affect the number of iterations of the fast search estimation operation used for estimating the distance of an object from the LiDAR system. For example, if the coarse estimate identifies the object as being a small distance away, the fine threshold may be related to fewer iterations being performed for evaluating the fast search estimate. However, if the coarse estimate identifies the object as being a large distance away, the fine threshold may be related to a larger number of iterations being performed for evaluating the fast search estimate.

In some embodiments of this disclosure, the fast search estimate is performed using a search type defined as a Fibonacci search, which is further discussed below in relation with FIGS. 4A to 4D.

Figure 4A:
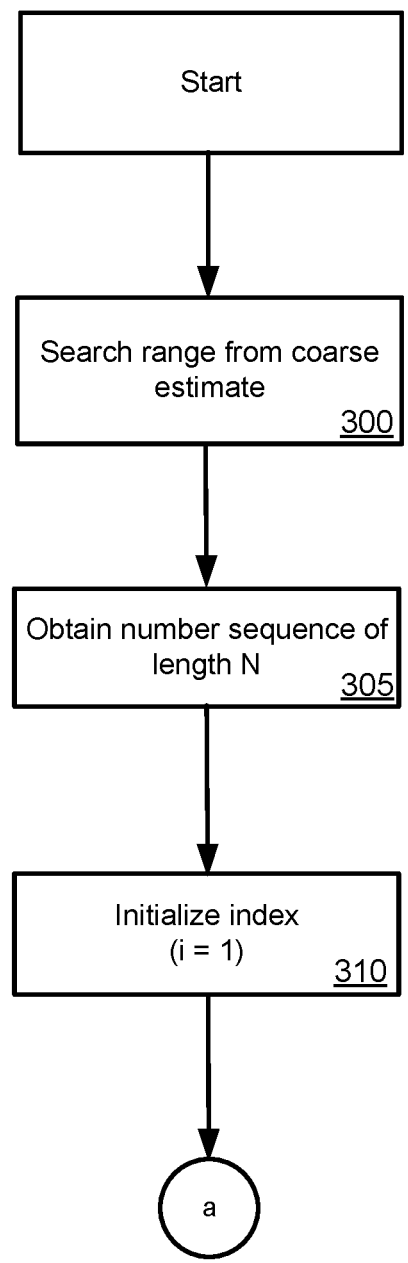
FIGS. 4A to 4D illustrate a frequency estimation procedure, according to an embodiment.

FIGS. 4A, 4B, 4C, and 4D illustrate the steps that can be included in a Fibonacci search performed in accordance with one or more embodiments of this disclosure. The Fibonacci search can begin as illustrated by FIG. 4A by determining the search range from the coarse estimate 300. This search range can be defined by two points and can be based on the coarse FFT result. The next step of the Fibonacci search can be to obtain (e.g. generate or retrieve from memory) a Fibonacci sequence of length N 305 where N can be a variable input. The next step can be to initialize the index counter i to the value of 1 310. Upon reaching node a, the search continues with the steps as outlined in FIG. 4B.

Figure 4B:
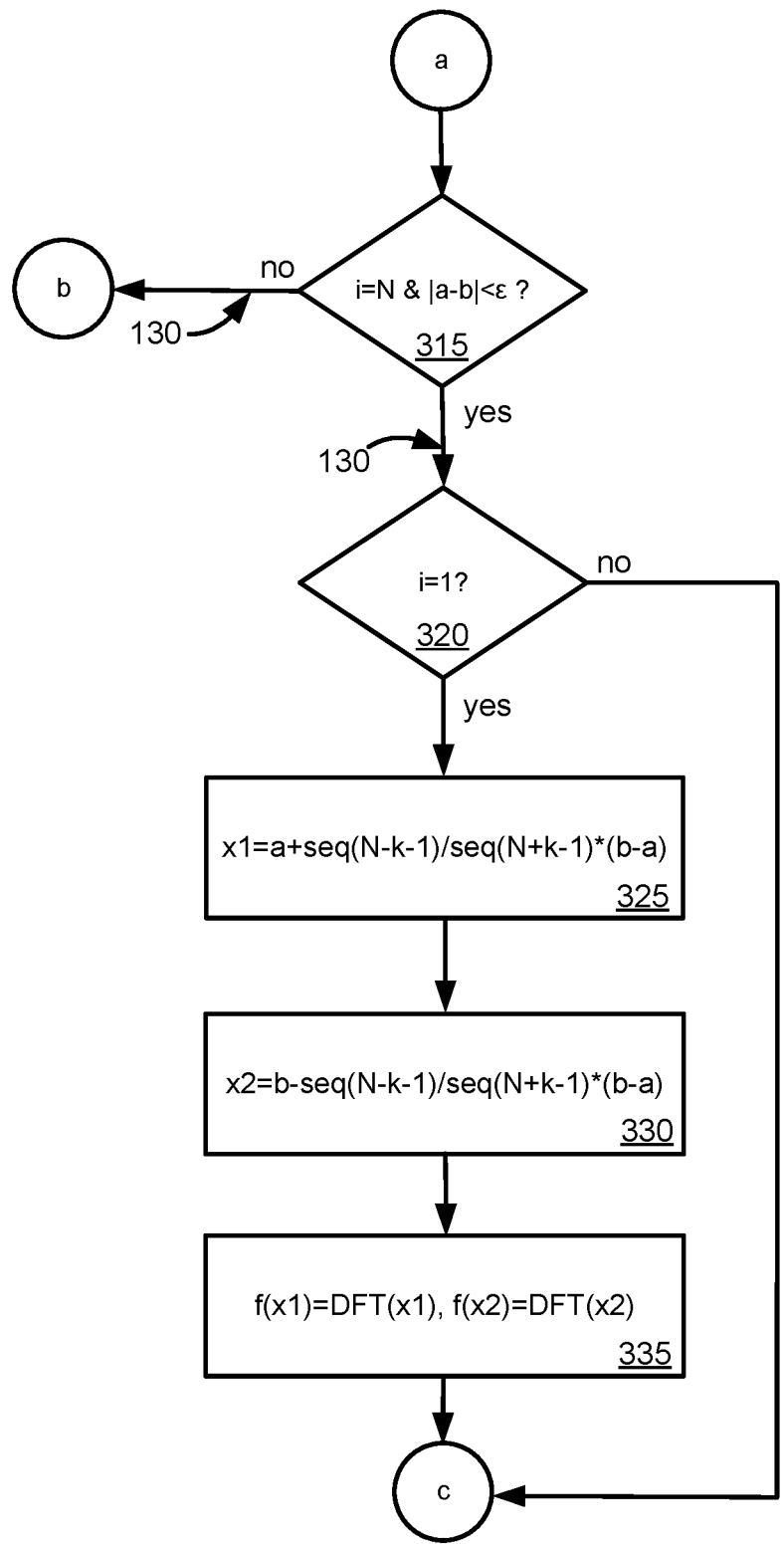

FIG. 4B illustrates the generation of two points that can be used for the Fibonacci search and the discrete Fourier transform (DFT) that can be applied to these two points. The first search value can be less than the second search value and both the first and second search values can be within a search range. A person skilled in the art will understand that a DFT can be the discrete version of a Fourier transform and that the DFT can transform a signal from its time domain representation to its representation in the frequency domain. A person skilled in the art will also understand that a FFT operation can involve one of a variety of efficient algorithms that can be used to compute a DFT. A person skilled in the art will also understand that computing a DFT of n points by using only its definition can take $\Theta(n^2)$ time whereas an FFT operation can compute substantially the same result in only $\Theta(n \log n)$ steps. As a part of generating the two points of the Fibonacci search, the index can be compared to variable input N and can be logically ANDed with the absolute value of the difference between two points that can be returned by the coarse FFT. This difference between the two points can be less than tolerance c appearing in the comparison in 315. However, if the difference is greater than the tolerance ε, the search moves to node b and further steps of the search are defined in FIG. 4D. If the index is equal to these values then the Fibonacci search can check if the index is equal to 1 320. If the index is equal to 1, the Fibonacci search can calculate 325 a first point x1, calculate 330 a second point x2, and can determine 335 DFTs f(x1), f(x2) of the first point x1 and the second point x2, respectively. The estimated first object distance can be arrived at using the first search value by determining the DFT of the first search value. The estimated second object distance can be arrived at using the second search value by determining the DFT of the second search value. Upon reaching node c, the search continues with the steps as outlined in FIG. 4C.

Figure 4C:
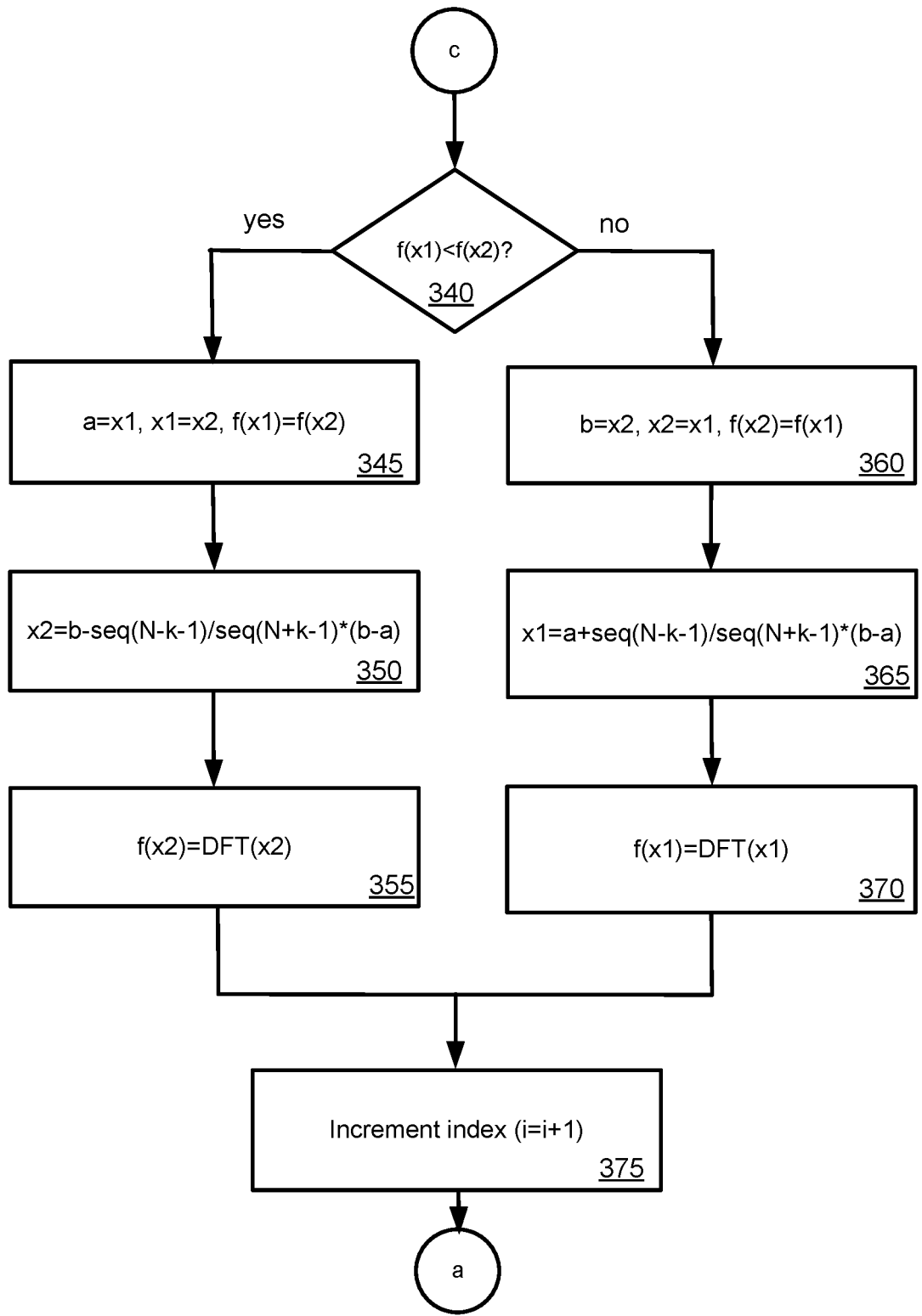

FIG. 4C illustrates the operation of the Fibonacci search when the DFT f(x1) of the first point x1 is less than the DFT f(x2) of the second point x2, and also, in the right branch, the operation of this search when the DFT of the first point is greater than or equal to the DFT of the second point 340. When the DFT of the first point is less than the DFT of the second point, the DFT of the first point is assigned to the first point returned by the coarse FFT, the second point is assigned to the first point, and the DFT of the second point is assigned to the DFT of the first point 345. The second point is then re-calculated 350 and the DFT of the second point is then re-calculated 355. When the DFT of the first point is greater than or equal to the DFT of the second point, the second point is assigned to the second point returned by the coarse DFT, the first point is assigned to the second point, and the DFT of the first point is assigned to the DFT of the second point 360. The first point is then re-calculated 365 and the DFT of the first point is then re-calculated 370. The index is then incremented by one 375. The search subsequently either, eliminates the search values from the search range that are less than the first search value or eliminates the search values from the search range that are greater than the second search value. Upon reaching node a, the search returns to FIG. 4B and continues with the steps as outlined in FIG. 4B.

Figure 4D:
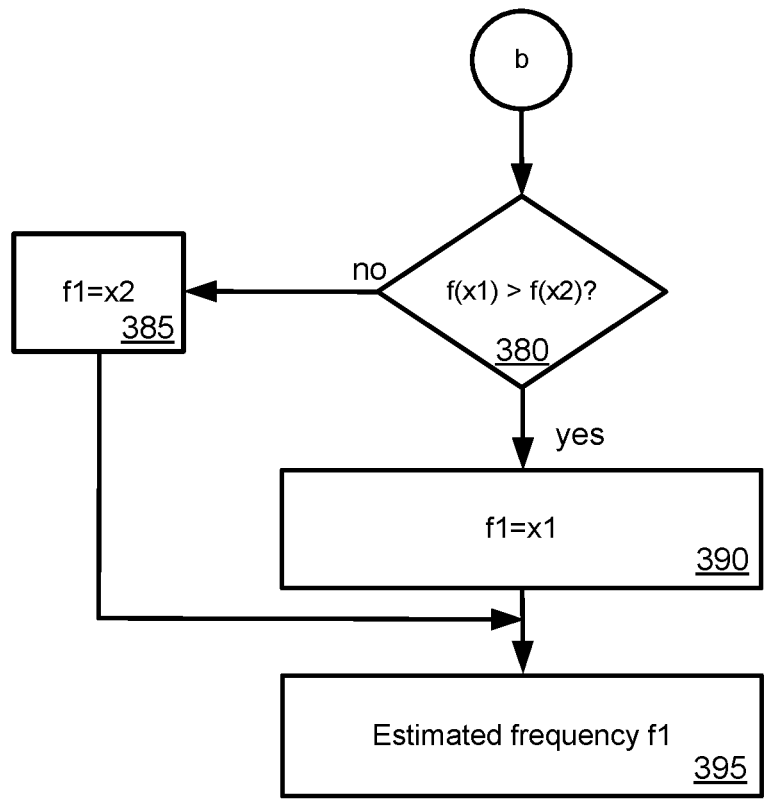

FIG. 4D illustrates further stages of the Fibonacci search. The DFT of the first value can be compared to the DFT of the second value 380. If the DFT of the first value is greater than the DFT of the second value then the first value is assigned to the first frequency 390. If the DFT of the second value is greater than the DFT of the first value then the second value is assigned to the first frequency 385. The estimated first frequency is then returned 395.

Embodiments of this disclosure can include a precision threshold and this precision threshold can be arrived at using the coarse estimate of the distance of the object from the LiDAR system.

Embodiments of this disclosure can include a fast search estimate that can be arrived at using one or more iterations of a search operation.

Embodiments of this disclosure can include a search operation that can be used to find a given value included in a list of values.

Embodiments of this disclosure can include a number of iterations of the search technique that can be performed until the fast search estimate of the distance of the object from the LiDAR system is within the precision threshold or fine threshold. In some embodiments, the number of iterations may or may not be predetermined and may return two values.

Embodiments of this disclosure can include a fast search estimate search that can be performed by a LiDAR system to estimate a distance of an object from the LiDAR system. This fast search estimate search can include arriving at a first search value and a second search value where the fast search value can be less than the second search value and both the first and second search values can be within a search range. This fast search estimate can also include arriving at an estimated first object distance where the estimated first object distance can be arrived at using the first search value. This fast search estimate can also include arriving at an estimated second object distance where the estimated second object distance can be arrived at using the second search value. This fast search estimate can also include arriving at either eliminating search values from the search range that can be less than the first search value or eliminating search values from the search range that can be greater than the second search value.

Embodiments of this disclosure can include a search range that can be arrived at using a coarse estimate of the distance of the object from the LiDAR system.

Embodiments of this disclosure can arrive at an estimated first object distance by arriving at a minimum search value that can be included in the search range. These embodiments can also arrive at a first search value using a difference between a sequence length and a next lower search value. These embodiments can also arrive at a second search value using an aggregate of the sequence length and the next lower search value expanded by a difference between a maximum search value that can be included in the search range and the minimum search value that can be included in the search range.

Embodiments of this disclosure can arrive at the estimated second object distance by arriving at a maximum search value that can be included in the search range. These embodiments can also arrive at a first search value using a difference between a sequence length and a next lower search value. These embodiments can also arrive at a second search value using an aggregate of the sequence length and the next lower search value expanded by a difference between a maximum search value that can be included in the search range and the minimum value included in the search range. These embodiments can further include arriving at a new first search value and a new second search value for each iteration of the fast search estimate search.

Embodiments of this disclosure can further include arriving at a new estimated first object distance of the object from the LiDAR system that can be based on the new first search value. These embodiments also can further include arriving at a new estimated second object distance of the object from the LiDAR system that can be based on the new second search value.

Embodiments of this disclosure can arrive at the estimate of the distance of the object from the LiDAR system that can be based on the estimated first object distance exceeding the estimated second object distance.

Embodiments of this disclosure that can be used by the LiDAR system when estimating a distance of an object from the LiDAR system can include arriving at a coarse estimate of the distance of the object from the LiDAR system and can arrive at a fast search estimate of the distance of the object from the LiDAR system that can use adaptive precision.

Figure 5:
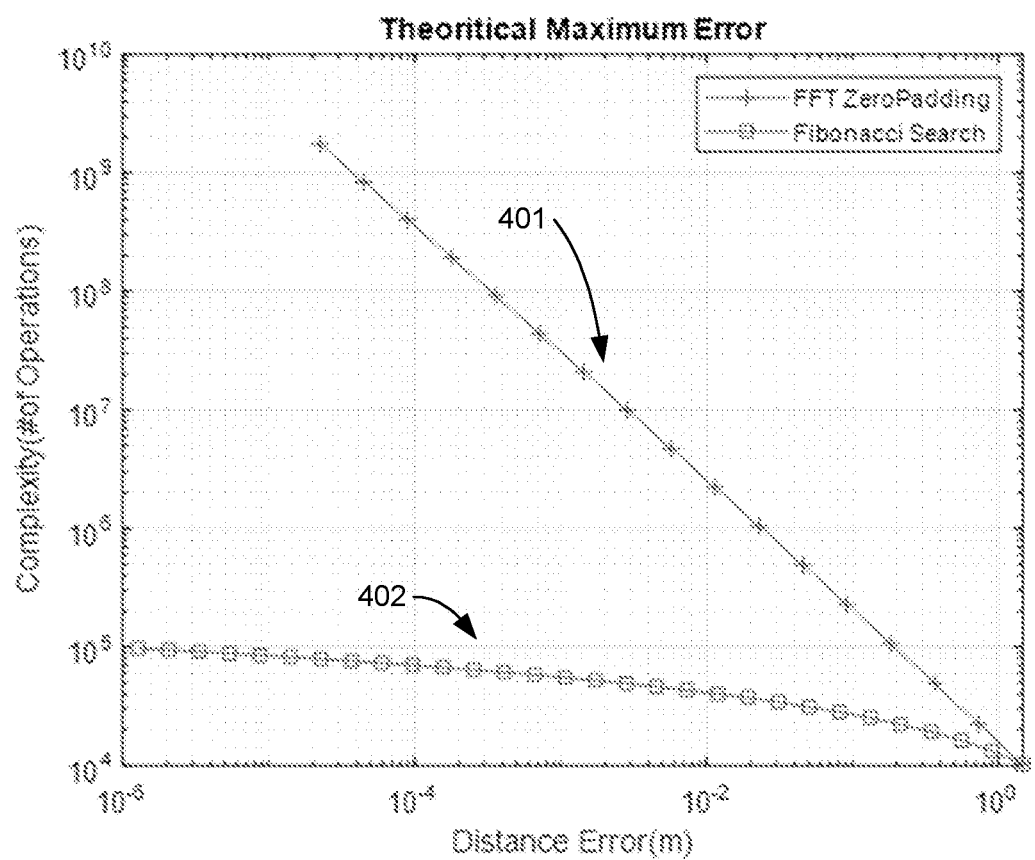
FIG. 5 illustrates a comparison graph of a theoretical maximum error of the estimated distance, the comparison between a FFT with zero padding technique and a Fibonacci search in accordance with embodiments.

FIG. 5 illustrates a comparison graph of a theoretical maximum error of the estimated distance, the comparison between a FFT with zero padding technique and a Fibonacci search in accordance with embodiments. As illustrated in FIG. 5, the computational complexity associated with the FFT with zero padding 401 increases as the distance error decreases. Also illustrated in FIG. 5, while the computation complexity associated with the Fibonacci search 402 increases as the distance error decreases, the rate of computational complexity is significantly lower than that when FFT with zero padding is used.

Figure 6:
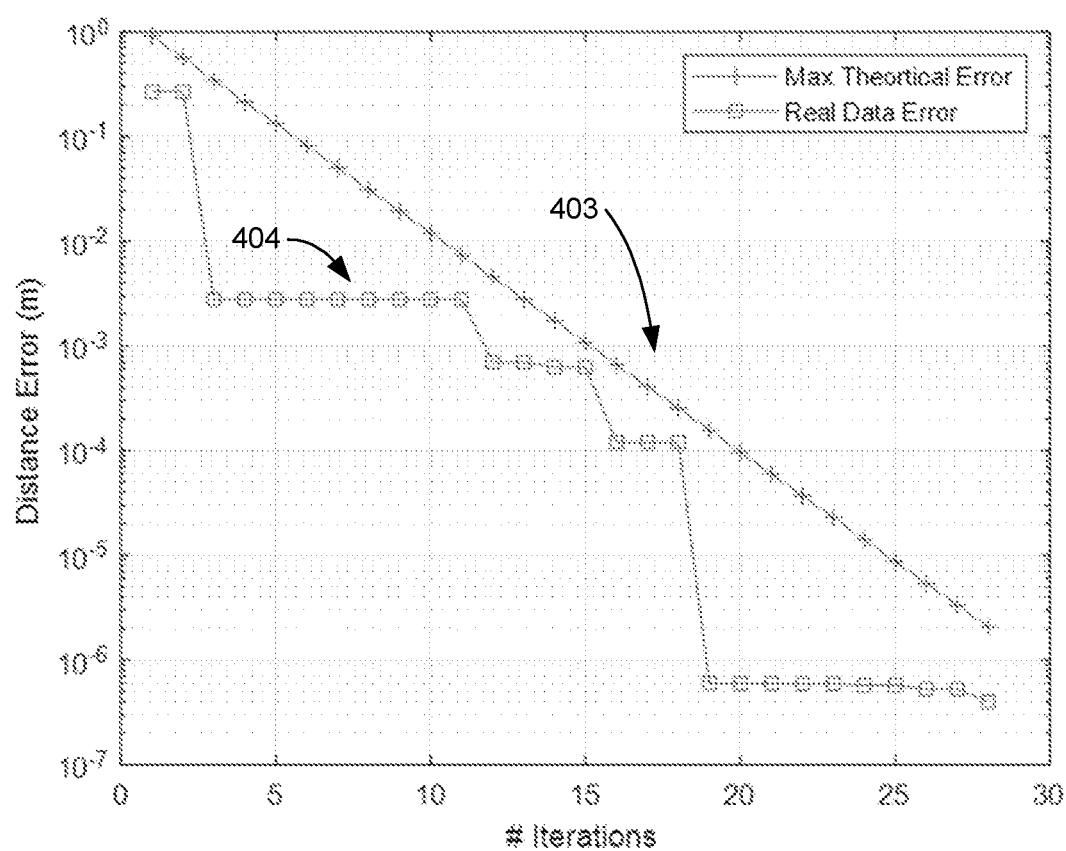
FIG. 6 illustrates a comparison graph of the Fibonacci search results performed on real data compared with the theoretical maximum error, in accordance with embodiments.

FIG. 6 illustrates a comparison graph of the Fibonacci search results performed on real data compared with the theoretical maximum error, in accordance with embodiments. FIG. 6 illustrates the comparison between the distance error and the number of iterations required for comparison of the maximum theoretical error 403 and real data error 404 for use of a Fibonacci search. It is clear from this graph that as the desired distance error decreases the number of iterations of a Fibonacci search increases in order to substantially reach the maximum theoretical error.

Figure 7:
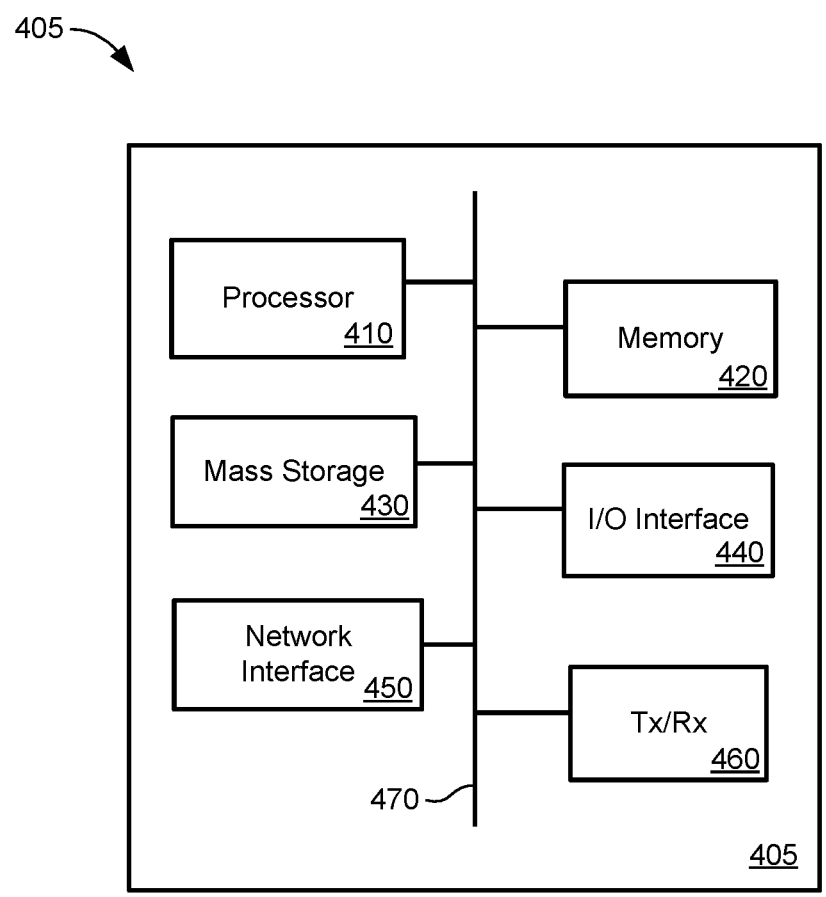
FIG. 7 illustrates an exemplary block diagram of a processing system that may be used for implementing the various LiDAR functions, according to an embodiment.

FIG. 7 illustrates exemplary block diagram of a processing system 405 that may be used for implementing the methods disclosed herein. In some embodiments, the processing system 405 may be an element of a LiDAR system. Specific devices may utilize all of the components shown or only a subset of the components and levels of integration may vary from device to device. Furthermore, a device may contain multiple instances of a component, such as multiple processors, memories, transmitters, receivers, etc. The processing system 405 can typically include a processor 410, such as a Central Processing Unit (CPU), and may further include specialized processors such as a Graphics Processing Unit (GPU) or other such processor, a memory 420, a network interface 450 and a bus 470 to connect the components of processing system 405. ED 405 may optionally also include components such as a mass storage device 430.

The memory 420 may comprise any type of non-transitory system memory, readable by the processor 410, such as static random-access memory (SRAM), dynamic random access memory (DRAM), synchronous DRAM (SDRAM), read-only memory (ROM), or a combination thereof. In specific embodiments, the memory 420 may include more than one type of memory, such as ROM for use at boot-up, and DRAM for program and data storage for use while executing programs. The bus 470 may be one or more of any type of several bus architectures including a memory bus or memory controller, a peripheral bus, or a video bus.

The processing system 405 may also include one or more network interfaces 450, which may include at least one of a wired network interface and a wireless network interface. The network interfaces 450 can allow the processing system 405 to communicate with remote entities.

The mass storage 430 may comprise any type of non-transitory storage device configured to store data, programs, and other information and can make the data, programs, and other information accessible over bus 470. The mass storage 430 may comprise, as a non-limiting example, one or more of a solid-state drive, hard disk drive, a magnetic disk drive, or an optical disk drive. In some embodiments, mass storage 430 may be remote to the processing system 405 and accessible through use of a network interface such as interface 450. In the illustrated embodiment mass storage 430 is distinct from memory 420 where it is included and may generally perform storage tasks compatible with higher latency, but may generally provide lesser or no volatility. In some embodiments, mass storage 430 may be integrated with a memory 420 to form a heterogeneous memory.

Other devices may be coupled to the processing system 405 and additional or fewer interfaces may be utilized. For example, a serial interface such as Universal Serial Bus (USB) (not shown) may be used to provide an interface for an external device.

In some embodiments, processing system 405 may be a standalone device, while in other embodiments processing system 405 may be comprised of multiple devices.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method of estimating a distance of an object from a LIDAR system, performed by the LiDAR system, the method comprising:
   determining a coarse estimate of the distance of the object from the LiDAR system;
   refining the coarse estimate of the distance by determining a fast search estimate of the distance of the object from the LiDAR system using a search operation; and
   performing one or more iterations of the search operation, wherein the fast search estimate is within a precision threshold, the precision threshold is adjustable at least in part based on the coarse estimate, and wherein the number of iterations is at least in part based on the precision threshold.

2. The method of claim 1, wherein determining a coarse estimate is performed using a fast Fourier transform operation.

3. The method of claim 1, wherein the search operation is a Fibonacci search.

4. A method of estimating a distance of an object from a LiDAR system, performed by the LiDAR system, the method comprising:
   determining a coarse estimate of the distance of the object from the LiDAR system; and
   refining the coarse estimate of the distance by determining a fast search estimate of the distance of the object from the LiDAR system using one or more iterations of a Fibonacci search, wherein the fast search estimate is within a precision threshold, the precision threshold at least in part based on the coarse estimate,
   wherein determining the fast search estimate comprises:
      determining a first search value and a second search value wherein the first search value is less than the second search value and both the first search value and second search value are within a search range, the search range at least in part defined by the coarse estimate;
      determining an estimated first object distance using the first search value;
      determining an estimated second object distance using the second search value;

comparing the first object distance and the second object distance;
based on the comparison, either eliminating, from the search range, search values that are less than the first search value or eliminating, from the search range, search values that are greater than the second search value; and
iterating the Fibonacci search until the fast search estimate is within the precision threshold.

5. The method of claim 4 wherein determining the estimated first object distance includes:
determining a minimum search value included in the search range;
determining a first search value using a difference between a length of a selected Fibonacci sequence and a next lower search value; and
determining a second search value using an aggregate of the length of the selected Fibonacci sequence and the next lower search value expanded by a difference between a maximum search value included in the search range and the minimum search value included in the search range.

6. The method of claim 4 wherein determining the estimated second object distance includes:
determining a maximum search value included in the search range;
determining a first search value using a difference between a length of a selected Fibonacci sequence and a next lower search value; and
determining a second search value using an aggregate of the length of the selected Fibonacci sequence and the next lower search value expanded by a difference between a maximum search value included in the search range and the minimum search value included in the search range.

7. The method of claim 4 further comprising determining a new first search value and a new second search value for each iteration of one or more iterations of the Fibonacci search.

8. The method of claim 7 further comprising determining a new estimated first object distance of the object from the LiDAR system based on the new first search value.

9. The method of claim 8 further comprising determining a new estimated second object distance of the object from the LiDAR system based on the new second search value.

10. An apparatus for estimating a distance of an object from a LIDAR system, performed by the LiDAR system, the apparatus comprising:
a processor; and
a memory storing machine executable instructions, which when executed by the processor configures the apparatus to:
determine a coarse estimate of the distance of the object from the LiDAR system;
refine the coarse estimate of the distance by determining a fast search estimate of the distance of the object from the LiDAR system using a search operation;
perform one or more iterations of the search operation; and
wherein the fast search estimate is within a precision threshold, the precision threshold is adjustable at least in part based on the coarse estimate, and wherein the number of iterations is at least in part based on the precision threshold.

11. The apparatus of claim 10, wherein determining a coarse estimate is performed using a fast Fourier transform operation.

12. The apparatus of claim 10, wherein the search operation is a Fibonacci search.

13. The apparatus of claim 12, wherein when determining the fast search estimate, the machine executable instructions when executed by the processor further configure the apparatus to:
determine a first search value and a second search value wherein the first search value is less than the second search value and both the first search value and second search value are within a search range, the search range at least in part defined by the coarse estimate;
determine an estimated first object distance using the first search value;
determine an estimated second object distance using the second search value;
compare the first object distance and the second object distance;
based on the comparison, either eliminate, from the search range, search values that are less than the first search value or eliminate, from the search range, search values that are greater than the second search value; and
iterate the search operation until the fast search estimate is within the precision threshold.

14. The apparatus of claim 13 wherein when determining the estimated first object distance includes, the machine executable instructions when executed by the processor further configure the apparatus to:
determine a minimum search value included in the search range;
determine a first search value using a difference between a length of a selected Fibonacci sequence and a next lower search value; and
determine a second search value using an aggregate of the length of the selected Fibonacci sequence and the next lower search value expanded by a difference between a maximum search value included in the search range and the minimum search value included in the search range.

15. The apparatus of claim 13 wherein when determining the estimated second object distance includes, the machine executable instructions when executed by the processor further configure the apparatus to:
determine a maximum search value included in the search range;
determine a first search value using a difference between a length of a selected Fibonacci sequence and a next lower search value; and
determine a second search value using an aggregate of the length of the selected Fibonacci sequence and the next lower search value expanded by a difference between a maximum search value included in the search range and the minimum search value included in the search range.

16. The apparatus of claim 13, the machine executable instructions when executed by the processor further configure the apparatus to determine a new first search value and a new second search value for each iteration of one or more iterations of the search operation.

17. The apparatus of claim 16, the machine executable instructions when executed by the processor further configure the apparatus to determine a new estimated first object distance of the object from the LiDAR system based on the new first search value.

18. The apparatus of claim 17, the machine executable instructions when executed by the processor further configure the apparatus to determine a new estimated second object distance of the object from the LiDAR system based on the new second search value.

\* \* \* \* \*